US010962125B2

(12) United States Patent
Forbes et al.

(10) Patent No.: US 10,962,125 B2
(45) Date of Patent: Mar. 30, 2021

(54) VALVE DISCS FOR USE WITH FLUID VALVES

(71) Applicant: Emerson Vulcan Holding LLC, St. Louis, MO (US)

(72) Inventors: Matthew Douglas Forbes, Candler, NC (US); Curtis Lamar Sharpe, Marshall, NC (US)

(73) Assignee: EMERSON VULCAN HOLDING LLC, St. Louis, MO (US)

( * ) Notice: Subject to any disclaimer, the term of this patent is extended or adjusted under 35 U.S.C. 154(b) by 43 days.

(21) Appl. No.: 16/104,576

(22) Filed: Aug. 17, 2018

(65) Prior Publication Data

US 2020/0056712 A1 Feb. 20, 2020

(51) Int. Cl.
*F16K 17/04* (2006.01)

(52) U.S. Cl.
CPC .......... *F16K 17/04* (2013.01); *F16K 17/0486* (2013.01)

(58) Field of Classification Search
CPC .............................. F16K 17/04; F16K 17/0486
See application file for complete search history.

(56) References Cited

U.S. PATENT DOCUMENTS

| | | | | |
|---|---|---|---|---|
| 2,017,297 A * | 10/1935 | Sorensen | ............. | F16K 17/082 137/536 |
| RE22,164 E * | 8/1942 | Gentzal | ................... | F16K 17/04 137/543 |
| 2,683,464 A | 7/1954 | St. Clair | | |
| 4,267,858 A * | 5/1981 | Lewis | ................... | F16K 17/042 137/327 |
| 4,718,450 A * | 1/1988 | Ezekoye | ............ | F16K 17/0433 137/469 |
| 4,930,539 A * | 6/1990 | van Rooy | ............. | F16K 15/063 137/514 |
| 5,152,310 A * | 10/1992 | O'Bryon | ................. | F16L 41/06 137/15.08 |
| 9,851,018 B2 * | 12/2017 | Almazan | ............. | F16K 37/0041 |
| 2015/0211500 A1 * | 7/2015 | Kumazawa | ............. | F04B 1/182 137/471 |

FOREIGN PATENT DOCUMENTS

| | | |
|---|---|---|
| CN | 204062048 | 12/2014 |
| GB | 751393 | 6/1956 |

OTHER PUBLICATIONS

Emerson, "Kunkle Series 6000 Safety Valves," Safety and Relief Products, VCTDS-00394-EN,2017, 2 pages.

(Continued)

*Primary Examiner* — Jessica Cahill
*Assistant Examiner* — Patrick C Williams
(74) *Attorney, Agent, or Firm* — Hanley, Flight & Zimmerman, LLC

(57) ABSTRACT

Valve discs for use with fluid valves are disclosed herein. An example valve disc for a fluid valve includes a base portion having a first side to engage a seat of the fluid valve and a second side opposite the first side, the second side being generally planar and having a centrally located recess to receive a valve stem. The valve disc further includes a circumferential wall extending away from a peripheral edge of the second side, an inner surface of the wall and the second side defining a cylindrical cavity, wherein a height of the circumferential wall is at least twice a thickness of the circumferential wall.

18 Claims, 6 Drawing Sheets

(56) References Cited

OTHER PUBLICATIONS

Internation Seaching Authority, "International Search Report", issued in connection with International Patent Application No. PCT/US2019/046446, dated Nov. 11, 2019, (6 pages).
Internation Seaching Authority, "Written Opinion", issued in connection with International Patent Application No. PCT/US2019/046446, dated Nov. 11, 2019, (9 pages).

* cited by examiner

VALVE DISCS FOR USE WITH FLUID VALVES

FIELD OF THE DISCLOSURE

This disclosure relates generally to fluid valves and, more particularly, to valve discs for use with fluid valves.

BACKGROUND

Pressure relief valves are used in a variety of applications to maintain a pressure within a system below a predetermined maximum pressure (e.g., a maximum fluid pressure). Specifically, if the pressure within the system exceeds a predetermined maximum pressure, the pressure relief valve vents a fluid or vapor to the atmosphere and/or other outlet until the pressure within the system decreases below the predetermined maximum pressure. The amount and rate at which the fluid or vapor is vented to the atmosphere is associated with the magnitude of the pressure within the container.

Different pressure relief valves have different sizes, start-to-discharge pressures (e.g., a pressure at which fluid begins to flow within the pressure relief valve), and flow capacities. A pressure relief valve may be selected for use with a system based on a design specification of the system such as a maximum pressure to which a pressure vessel within the system can be safely exposed.

Known pressure relief valves often include a single spring that exerts a force on a stem to urge a valve disc (e.g., a fluid flow control member) towards a valve seat. A fluid valve can include a seat that is made of a hard material (e.g., a metal). In some examples, the seat is integral to a fluid valve body (e.g., not fitted to the valve body). When the valve disc engages the valve seat, fluid flow within the pressure relief valve is prevented. When pressure within the system exceeds the maximum pressure, the force exerted by the spring is overcome, and the valve disc is urged away from the valve seat. Thus, pressure is reduced in the system until it is below the maximum pressure.

SUMMARY

An example valve disc for a fluid valve includes a base portion having a first side to engage a seat of the fluid valve and a second side opposite the first side, the second side being generally planar and having a centrally located recess to receive a valve stem. The valve disc further includes a circumferential wall extending away from a peripheral edge of the second side, an inner surface of the wall and the second side defining a cylindrical cavity, wherein a height of the circumferential wall at least twice a thickness of the circumferential wall.

An example valve disc for a fluid valve includes a circumferential wall to be disposed between a stem and a wall of the fluid valve to guide movement of the valve disc and a base portion having a first side to releasably engage a seat of the fluid valve and a second side to receive the stem, the base portion having a diameter and a height defined between the first side and the second side, wherein the diameter is at least twice the height.

Another example valve disc for a fluid valve includes an outer circumferential surface to slidably engage a wall of the fluid valve to guide movement of the valve disc and a cylindrical recess, a base of the recess having a stem cavity to receive a valve stem. The valve disc has a circumferential wall that is defined between an inner surface defined by the recess and the outer circumferential surface.

Figure 1:
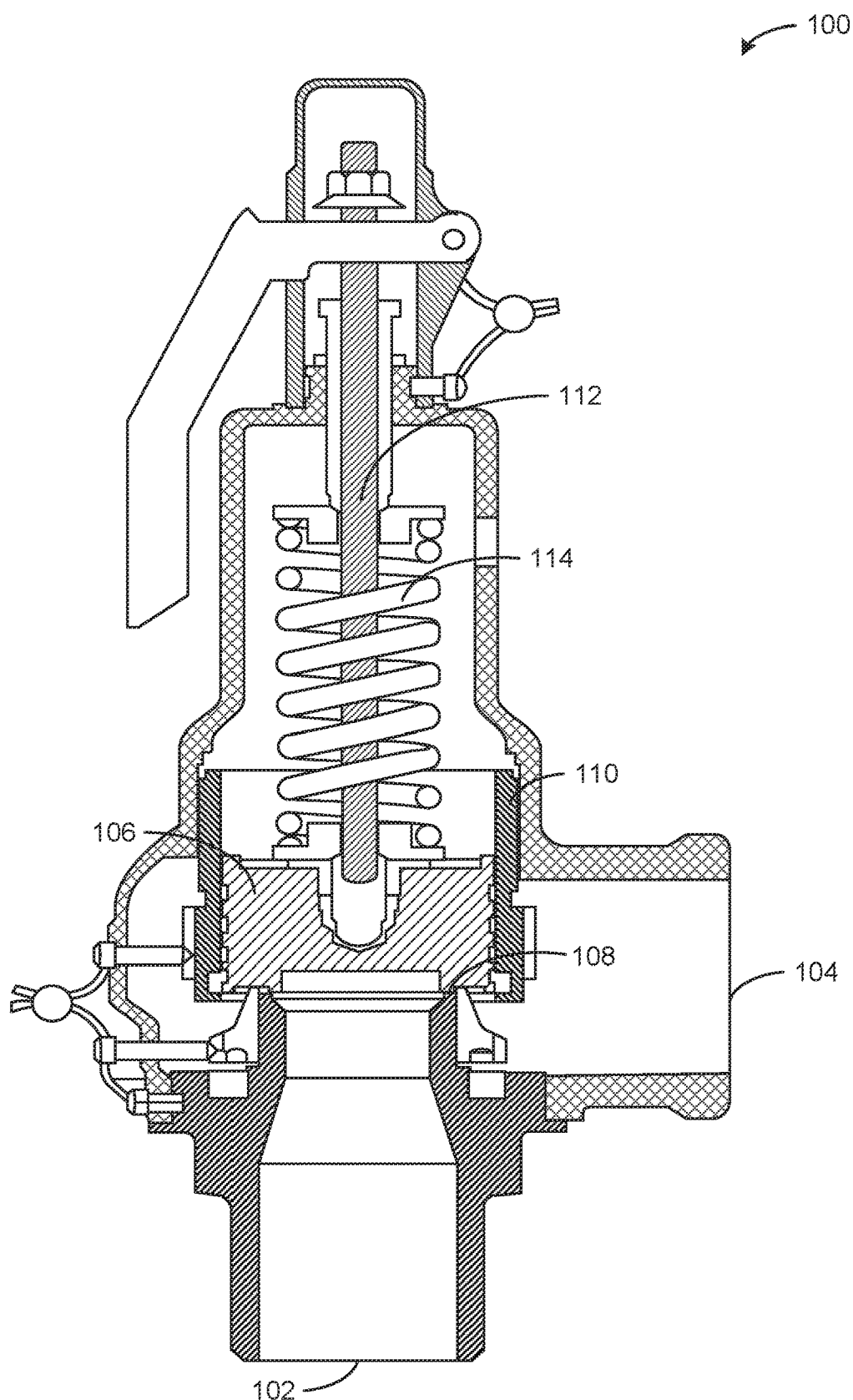
FIG. 1 is a cross-sectional view of a known fluid valve that includes a known valve disc.

The figures are not to scale. Instead, the thickness of the layers or regions may be enlarged in the drawings. In general, the same reference numbers will be used throughout the drawing(s) and accompanying written description to refer to the same or like parts. As used herein, when any part (e.g., a layer, film, area, region, or plate) is described as in any way being on (e.g., positioned on, located on, disposed on, or formed on, etc.) another part, the referenced part is either in contact with the other part or the referenced part is above the other part with one or more intermediate part(s) located therebetween. When any part is described as being in contact with another part, there is no intermediate part between the two parts.

DETAILED DESCRIPTION

Valve discs obstruct or prevent fluid flow within a body of a fluid valve. Valve discs disclosed herein significantly reduce the amount of material used to manufacture the valve disc while maintaining the strength and integrity of the valve disc. The reduction in material is accompanied by a decrease in material cost as well as manufacturing cost. Further, the valve discs disclosed herein can be created by forging, reducing the testing that is required to be performed on the valve disc prior to use. For example, known valve discs manufactured via casting are required to be subjected to pressure testing, while the forged valve discs disclosed herein are not required to undergo pressure testing. Further, the geometry of the valve discs disclosed herein is optimized for better surface finishes (e.g., by having fewer apertures, corners, and/or surfaces that are difficult to reach). For example, the geometry of the valve discs allows surfaces of the valve discs to have less surface roughness, fewer surface irregularities, etc.

FIG. 1 is a cross-sectional view of a known fluid valve 100 that includes a known valve disc. In the illustrated example, the fluid valve 100 is a pressure relief valve. The fluid valve 100 includes an inlet 102 and an outlet 104. In some examples, the inlet 102 and/or the outlet 104 are threaded to facilitate coupling of the fluid valve 100 to other devices or apparatus (e.g., a pressure vessel, etc.). In some examples, the inlet 102 is fluidly coupled to a tank, container, pressure vessel, pipe transporting fluid, or other apparatus used to store or transport fluid. In such examples, the fluid valve 100 operates to reduce pressure (e.g., fluid pressure) and/or prevent pressure from exceeding a predetermined maximum pressure (e.g., a maximum fluid pressure). For example, when pressure increases within a pressure vessel, the fluid valve 100 allows fluid to flow between the inlet 102 and the outlet 104. In some examples, the outlet 104 is fluidly coupled to the atmosphere, venting fluid to the atmosphere when the pressure in the fluid valve 100 exceeds the maximum pressure.

In the illustrated example, fluid entering the inlet 102 cannot flow through the fluid valve 100 to the outlet 104 because a valve disc 106 is positioned to prevent fluid flow through the fluid valve 100. The valve disc 106 releasably engages a seating surface 108 of the fluid valve 100 to prevent the flow of fluid. In the illustrated example, the valve disc 106 slidably engages a guide 110. The guide 110 guides movement of the valve disc 106 during operation of the fluid valve 100. For example, the guide 110 enables only vertical movement (e.g., up or down in the orientation of FIG. 1) of the valve disc 106.

The valve disc 106 is operatively coupled to a valve stem 112 that controls the position of the valve disc 106 within the fluid valve 100. The valve stem 112 is operatively coupled to a spring 114 that biases the valve stem 112 and valve disc 106 toward the seating surface 108. The spring 114 is to provide a predetermined force on the valve disc 106. For example, the spring 114 has a known spring constant and is compressed a predetermined amount to generate the predetermined force exerted on the valve disc 106. The force exerted by the spring 114 maintains the position of the valve disc 106 (e.g., positioned on the seating surface 108 to prevent the flow of fluid through the fluid valve 100) until pressure at the inlet 102 creates a force on the valve disc 106 that overcomes the predetermined force of the spring 114. For example, pressure at the inlet 102 is applied to the valve disc 106, thereby generating a force (e.g., pressure multiplied by an area of the valve disc 106). Accordingly, when the pressure at the inlet 102 exceeds a predetermined maximum pressure (e.g., a maximum fluid pressure), the valve disc 106 is released from the seating surface 108, allowing fluid to flow to the outlet 104.

When pressure at the inlet 102 increases, the valve disc 106 moves further from the seating surface 108, allowing more fluid to flow through the fluid valve 100. As pressure at the inlet 102 decreases, the valve disc 106 is urged toward the seating surface 108 by the spring 114 until the valve disc 106 engages the seating surface 108 to prevent fluid flow in the fluid valve 100.

Figure 2:
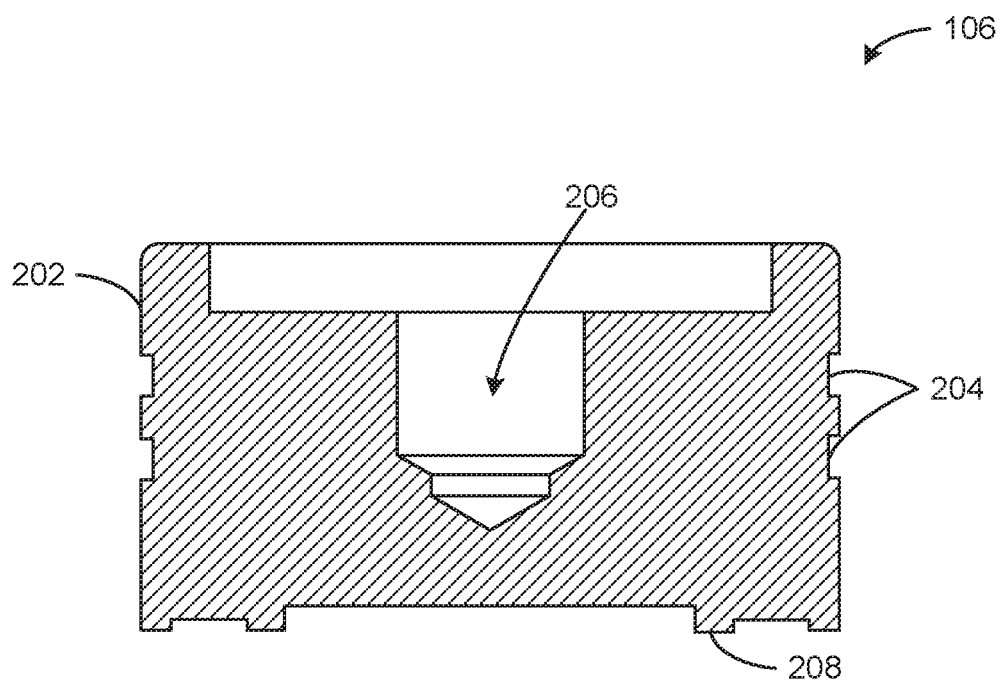
FIG. 2 is a cross-sectional view of the known valve disc of FIG. 1.

FIG. 2 is a cross-sectional view of the known valve disc 106 of FIG. 1. The valve disc 106 has an annular or circular shape (e.g., when viewed from a top view in the orientation of FIG. 2). The valve disc 106 is formed by casting a metal material. Such cast materials can be subject to porosity and require special pressure testing to meet the American Society of Mechanical Engineers (ASME) Boiler and Pressure Code. Further, because of the material used, the valve disc 106 is weaker and requires additional material, leading to an increase in cost.

The valve disc 106 includes a guiding surface 202 that slidably engages a guide (e.g., the guide 110 of FIG. 1) to guide the valve disc 106 within a fluid valve (e.g., the fluid valve 100 of FIG. 1). The guiding surface 202 includes cavities 204 that reduce drag and/or friction during movement of the valve disc 106 within the fluid valve 100.

The valve disc 106 also includes a stem cavity 206 to receive a valve stem (e.g., the valve stem 112 of FIG. 1). In operation, the valve stem 112 urges the valve disc 106 toward or away from a seating surface (e.g., the seating surface 108 of FIG. 1), as described in connection with FIG. 1.

The valve disc 106 further includes a seat interface 208 that releasably engages the seating surface 108 of the fluid valve 100. When pressure in the fluid valve 100 is below a predetermined maximum pressure (e.g., a maximum fluid pressure), the spring 114 maintains the position of the valve disc 106 against the seating surface 108. If the pressure in the fluid valve 100 increases above the predetermined maximum pressure, the force exerted on the valve disc 106 exceeds the force exerted by the spring 114, and the seat interface 208 is no longer engaged or in contact with the seating surface 108. Fluid flows within the fluid valve 100 when the seat interface 208 of the valve disc 106 is not in contact with the seating surface 108.

Figure 3:
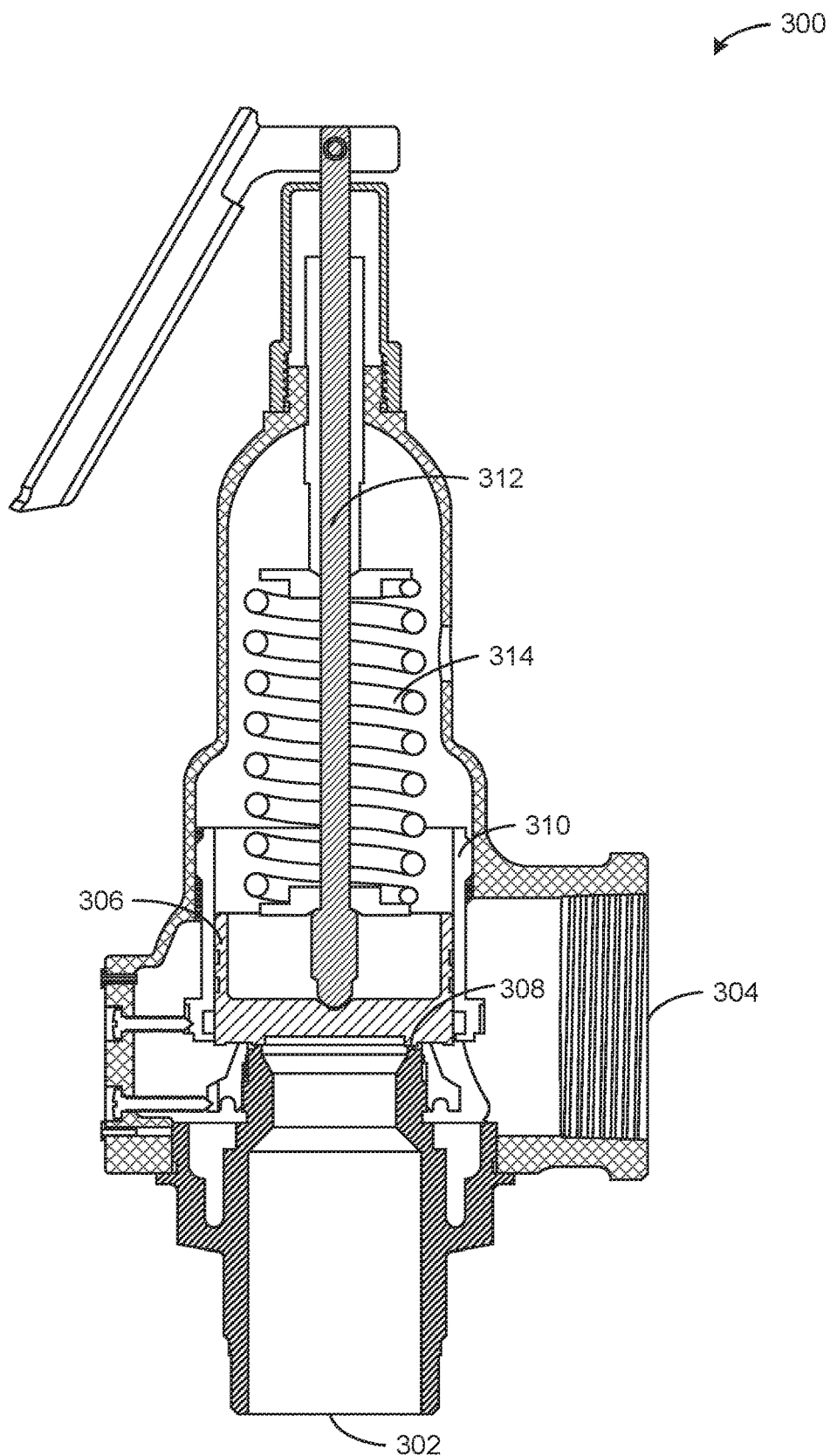
FIG. 3 is a cross-sectional view of an example fluid valve within which the teachings of this disclosure may be implemented.

FIG. 3 is a cross-sectional view of an example fluid valve 300 within which the teachings of this disclosure may be implemented. In the illustrated example, the fluid valve 300 is a pressure relief valve. Alternatively, in some examples, the fluid valve 300 is a globe valve, a check valve, or any other valve. The fluid valve 300 includes an example inlet 302 and an example outlet 304 through which fluid enters and exits the fluid valve 300, respectively. In some examples, the inlet 302 and the outlet 304 are threaded to couple to other devices and/or apparatus (e.g., a pressure vessel, a tank, a pipe, etc.). In some examples, the outlet 304 is fluidly coupled to the atmosphere to vent fluid from the fluid valve 300 to the atmosphere. In the illustrated example, fluid flow through the fluid valve 300 is prevented by a valve disc 306. In the illustrated example, the valve disc 306 is engaged with a seating surface 308 to prevent fluid flow in the fluid valve 300. In some examples, the seating surface 308 is made from a hard material (e.g., a metal). Further, in some examples, the seating surface is integral to the fluid valve 300 (e.g., not fitted to a valve body of the fluid valve 300).

The valve disc 306 is in contact with an example guide 310. The guide 310 guides movement of the valve disc 306 as it moves within the fluid valve 300. For example, the guide 310 enables only vertical movement of the valve disc 106 in the orientation of FIG. 3. The valve disc 306 is operatively coupled to an example valve stem 312, which urges the valve disc 306 toward or away from the seating surface 308. Movement of the valve stem 312 is controlled by an example spring 314. The spring 314 exerts a predetermined force that ultimately urges the valve disc 306 toward the seating surface 308. Pressure (e.g., fluid pressure) at the inlet 302 of the fluid valve 300 exerts a force on the valve disc 306 (e.g., a force generated by the pressure over an area of the valve disc 306) that urges the valve disc 306 away from the seating surface 308. As pressure at the inlet 302 increases, the force exerted on the valve disc 306 increases proportionally. When the force exerted on the valve disc 306 by the fluid pressure at the inlet 302 exceeds the predetermined force set by the spring 314, the valve disc 306 separates from the seating surface 308. Thus, fluid is allowed to flow through the fluid valve 300 to the outlet 304. In some examples, as pressure in the fluid valve 300 increases, the valve disc 306 moves further from the seating surface 308, allowing more fluid to flow through the fluid valve 300. In some examples, pressure decreases in the fluid valve 300 when the fluid is allowed to flow, and the valve disc 306 moves toward the seating surface 308 until the valve disc 306 engages the seating surface 308.

Figure 4:
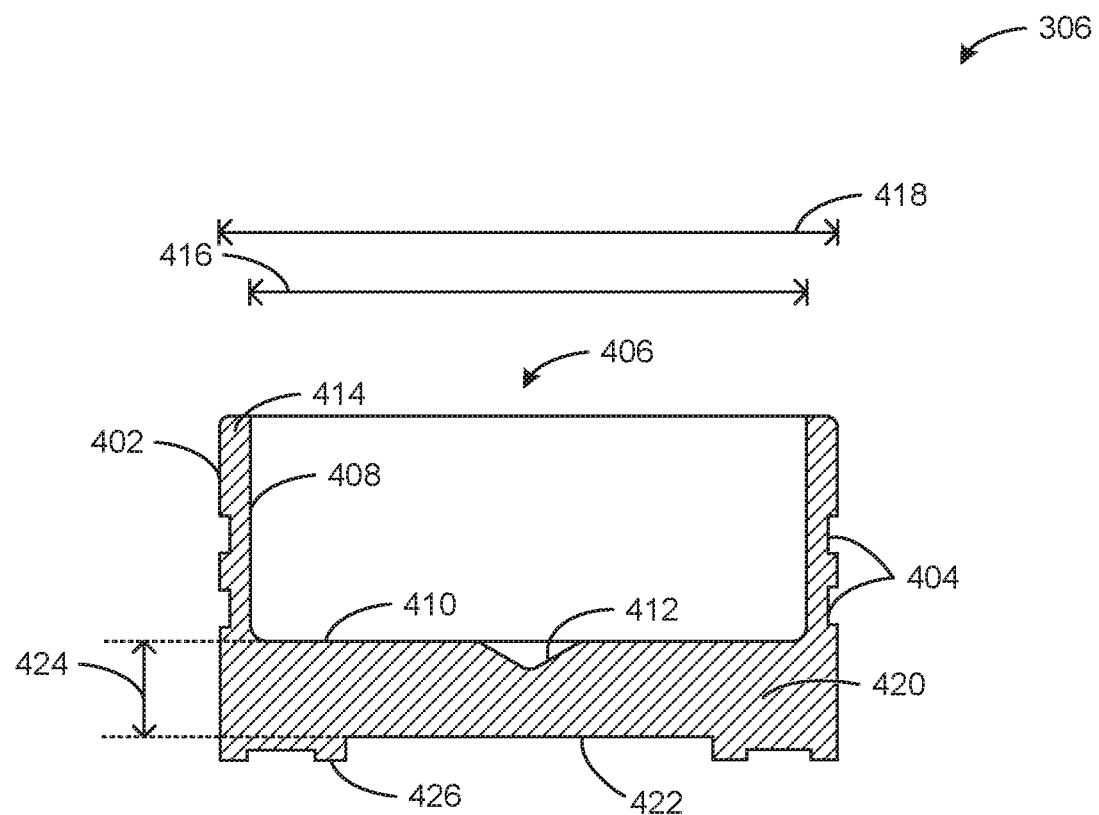
FIG. 4 is a cross-sectional view of the example valve disc of FIG. 3.

FIG. 4 is a cross-sectional view of the example valve disc 306 of FIG. 3. In the illustrated example, the valve disc 306 has an annular shape and is manufactured via a forging process. Forging of the valve disc 306 is made possible by the geometry associated with the valve disc 306. For example, the geometry includes few corners, apertures, and/or other geometric intricacies that can complicate the forging process and/or make forging infeasible. In some examples, the valve disc 306 has a circular or elliptical cross-sectional shape (e.g., when viewed from a top view in the orientation of FIG. 4). In the illustrated example, the valve disc 306 includes a guiding surface 402 to slidably engage a guide (e.g., the guide 310 of FIG. 3). The guiding surface 402 engages the guide 310 to guide movement of the valve disc 306 within a fluid valve (e.g., the fluid valve 300 of FIG. 3). The guiding surface 402 includes example cavities 404 to reduce drag and/or friction during movement of the valve disc 306 within the fluid valve 300.

The valve disc 306 further includes an example recess 406 bounded by an example inner surface 408 and an example recessed surface 410. The recess 406 of the illustrated example is a cylindrical recess (e.g., a cylindrical cavity). Additionally or alternatively, the recess 406 can have a different shape (e.g., a rectangular prism). In the illustrated example, the recessed surface 410 is horizontal in the orientation of FIG. 4. In some examples, the recessed surface 410 has a circular, elliptical, and/or annular shape (e.g., when viewed from a top view in the orientation of FIG. 4).

Centrally located on the recessed surface 410 of the illustrated example is a stem cavity 412. The stem cavity 412 receives a valve stem (e.g., the valve stem 312 of FIG. 3) that controls the position of the valve disc 306. In some examples, the valve stem 312 operatively couples to the stem cavity 412 of the valve disc 306, and controls movement of the valve disc 306 within the fluid valve 300 (e.g., in the orientation of FIG. 3). For example, when biased by a spring (e.g., the example spring 314 of FIG. 3), the valve stem 312 urges the valve disc 306 toward a valve seat or seating surface (e.g., the seating surface 308 of FIG. 3). As described above, pressure in the fluid valve 300 exerts a force on the valve disc 306 that opposes the biasing force of the spring 314. When the force exerted by the fluid pressure at the inlet 302 exceeds the biasing force of the spring 314, the valve disc 306 releases (e.g., is no longer engaged or in contact with) the seating surface 308, which allows the process fluid to flow between the example inlet 302 and outlet 304 of FIG. 3. As the valve disc 306 moves further away from the seating surface 308, more process fluid is vented (e.g., through the outlet 304).

The recessed surface 410 of the illustrated example is a generally planar surface. That is, the recessed surface 410 is planar across its entirety with the exception of the stem cavity 412. The stem cavity 412 of the illustrated example is not entirely in the same plane as the recessed surface 410 (e.g., the stem cavity 412 has a depth below the recessed surface 410). However, the recessed surface 410 surrounding the stem cavity 412 does exist in a single plane, thus making the recessed surface 410 a generally planar surface. In some examples, the recessed surface 410 varies in height (e.g., a distance from a bottom of the valve disc 306) by less than 0.10 inches across its diameter (i.e., the recessed surface 410 is flat within ±0.10 inches). For example, the stem cavity 412, centrally located on the recessed surface 410, causes a variation in the height of the recessed surface 410 (e.g., because of a depth of the stem cavity 412 relative to the recessed surface 410) of at most 0.10 inches below the recessed surface 410.

In some examples, the inner surface 408 is a circumferential surface (e.g., forming a circumferential boundary of the recess 406). In some examples, the inner surface 408 and the guiding surface 402 form an inner and outer surface of an example circumferential wall 414, respectively. The circumferential wall 414 and the recess 406 of the illustrated example form a hollow cylindrical shape (e.g., a cylindrical shell) in the valve disc 306. The circumferential wall 414 is disposed on a peripheral (e.g., outermost) edge of the recessed surface 410 and extends away (e.g., upward in the orientation of FIG. 4) from the recessed surface 410. Further, the height of the circumferential wall 414 is substantially greater than the thickness of the circumferential wall 414. In some examples, the circumferential wall 414 has a height at least twice its thickness. In some such examples, the height is at least five times the thickness of the circumferential wall 414. In some examples, the circumferential wall 414 has an annular, disc-like, or circular shape (e.g., when viewed from a top view in the orientation of FIG. 4).

The recess 406 of the illustrated example has a recess diameter 416, and the valve disc 306 has an outer diameter 418. The thickness of the circumferential wall 414 (e.g., a difference between the outer diameter 418 and the recess diameter 416) of the illustrated example is substantially uniform along a height of the circumferential wall 414. As used herein, a substantially uniform thickness is a thickness that varies by less than 0.05 inches. For example, the thickness of the circumferential wall 414 does not vary substantially (e.g., the thickness varies by no more than 0.05 inches) along the height of the circumferential wall 414. In some examples, the thickness varies by no more than 0.04 inches (e.g., between a minimum and maximum thickness).

The valve disc 306 further includes an example base portion 420. In some examples, the base portion 420 is defined between the recessed surface 410 and a base surface 422. In some examples, the base portion 420 has the same diameter as the outer diameter 418. The example base portion 420 has an example base height 424. The base portion 420 of the illustrated example has a diameter (e.g., the outer diameter 418) that is greater than the base height 424. In some examples, the outer diameter 418 is at least twice as large as the base height 424. In some examples, a ratio of the base height 424 to the diameter of the base portion 420 is 0.20 or less. Further, the base height 424 is less than the height of the circumferential wall 414. In some examples, a proportion of the height of the circumferential wall to the base height 424 is at least 1.5. Further still, in some examples the proportion of the height of the circumferential wall to the base height 424 is at least 2.

In the illustrated example, the valve disc 306 includes a seat interface 426 disposed on the base portion 420 of the valve disc 306 (e.g., a bottom surface of the base portion 420). The seat interface 426 contacts the seating surface 308 when the fluid valve 300 is closed (e.g., the fluid valve 300 prevents flow between the inlet 302 and the outlet 304 of FIG. 3). The seat interface 426 is released from (e.g., is no longer in contact with) the seating surface 308 when the pressure increases above a maximum pressure (e.g., when the force exerted on the valve disc 306 is greater than the biasing force caused by the example spring 320 of FIG. 3).

Figure 5:
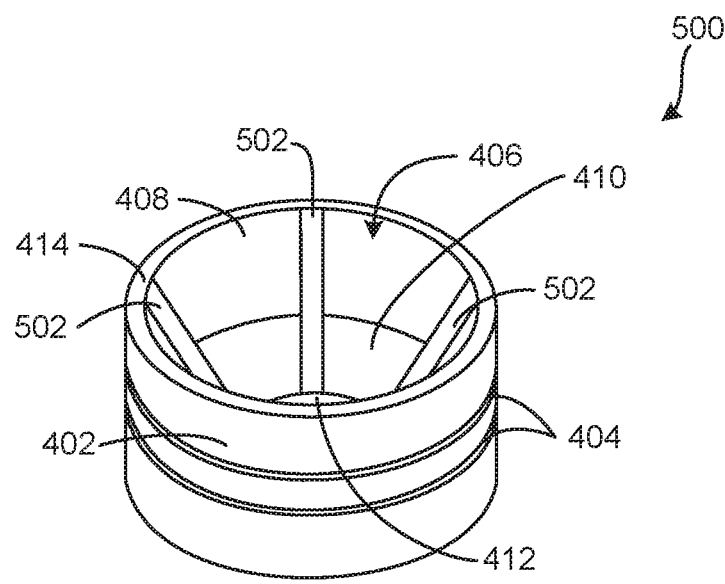
FIG. 5 is an isometric view of another example valve disc having supports.

FIG. 5 is an isometric view of another example valve disc 500 having supports 502. The example valve disc 500 has components substantially the same as the valve disc 306 of FIG. 4 except for the addition of the supports 502. The example supports 502 extend from the circumferential wall 414 (e.g., the inner surface 408) to the recessed surface 410 to provide structural support for the valve disc 306. In the illustrated example, the valve disc 500 includes multiple supports 502 (e.g., four supports 502) spaced apart along the inner surface 408 of the valve disc 306. The supports 502 of the illustrated example extend radially outward from a central location on the recessed surface 410 (e.g., near the stem cavity 412) toward the inner surface 408. In the illustrated example, the supports 502 extend at an angle measured from the recessed surface 410. In some examples, the angle is approximately a 45° angle (e.g., as measured from the recessed surface 410). Additionally or alternatively, the angle can be greater than 45° (e.g., a 60° angle) or less than 45° (e.g., a 30° angle).

In some alternative examples, the supports 502 are replaced by a single, continuous support 502 between the recessed surface 410 and the inner surface 408. In such an example, the support 502 is continuous along a circumferential path of the recessed surface 410 (e.g., the support 502 covers the entire surface of the recessed surface 410) and extends at an angle (e.g., 30°, 45°, 60°, etc.) measured from the recessed surface 410. The support 502 further provides structural integrity to the valve disc 306. In some examples, the recess 406 has a conic shape (e.g., the recess 406 decreases in diameter between the top of the circumferential wall 414 and the recessed surface 410) due to the angled shape of the support 502.

Figure 6:
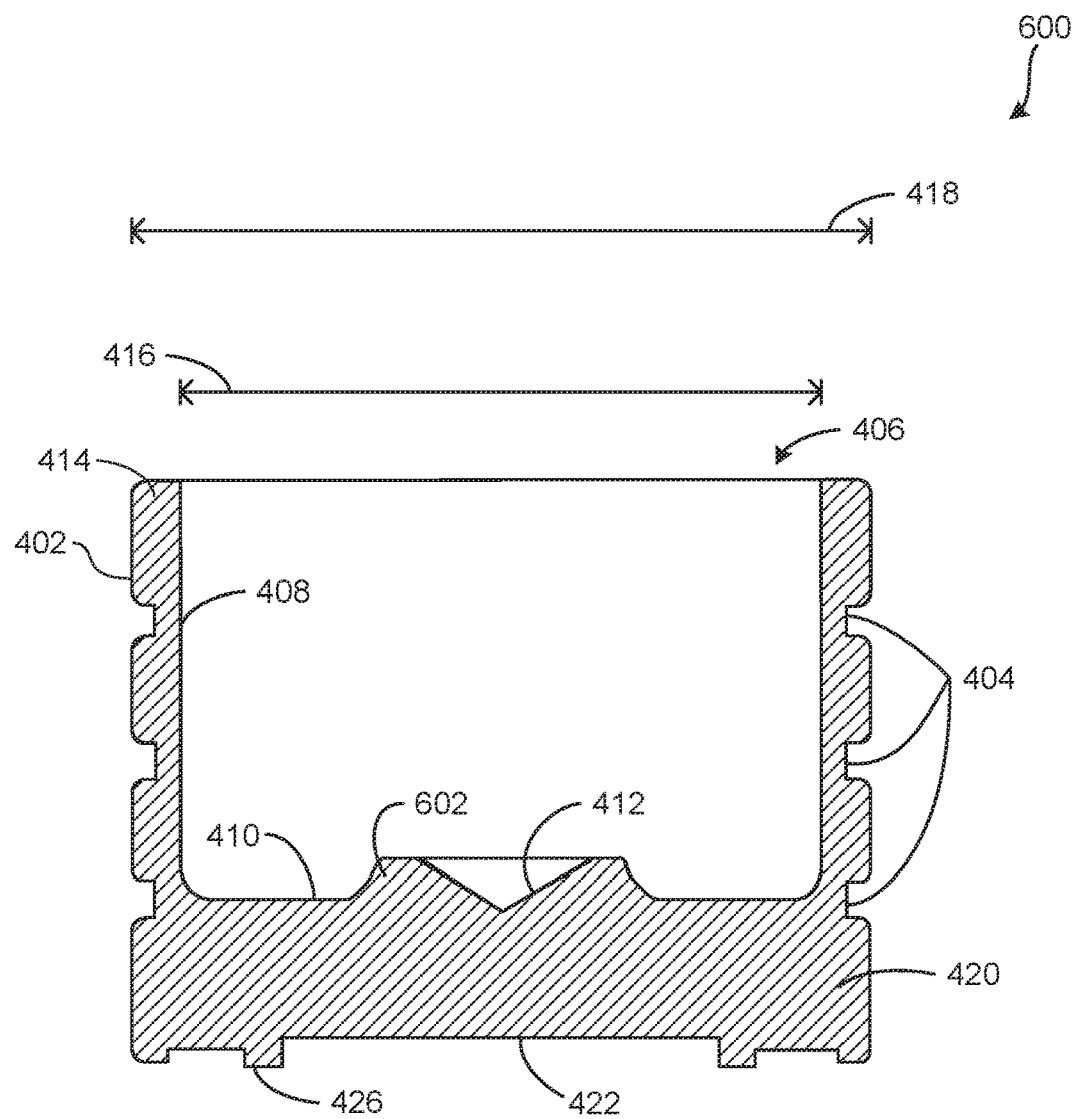
FIG. 6 is a cross-sectional view of yet another example valve disc having an example central step.

FIG. 6 is a cross-sectional view of yet another example valve disc 600 having an example central step 602. The valve disc 600 has components substantially the same as the valve disc 306 of FIG. 4 except for the addition of the central step 602. In some examples, the valve disc 600 is implemented in the example fluid valve 300 of FIG. 3. The central step 602 of the illustrated example is centrally located on the recessed surface 410 and includes the stem cavity 412. In some examples, the central step 602 has a cylindrical shape. In some such examples, the base of the central step 602 is rounded at an interface between the recessed surface 410 and the central step 602. The stem cavity 412 is raised above the recessed surface 410 to correctly position the stem cavity 412 in the fluid valve 300. For example, the recessed surface 410 is raised (e.g., by the central step 602) where the valve stem 312 of FIG. 3 is to operatively couple to the stem cavity 412, thus maintaining a proper connection between the stem cavity 412 and the valve stem 312. In some examples, the valve disc 600 includes the support(s) 502 of FIG. 5 to further strengthen the valve disc 600.

From the foregoing, it will be appreciated that example valve discs for use with fluid valves have been disclosed herein. The example valve disc 306 of FIG. 3 uses significantly less raw and/or unfinished material than the known valve disc 106 of FIG. 1. Accordingly, the valve disc 306 is lower in both weight and cost than the known valve disc 106. Further, the geometry of the valve disc 306 allows the valve disc 306 to be easily forged due to the geometry, which includes few irregular or non-uniform surfaces (e.g., corners, apertures, etc.) that cause difficulties in the forging process. Because the valve disc 306 is forged, less expensive forging alloys can be used instead of the more expensive materials used when a valve disc is manufactured via casting (e.g., specialty alloys) and/or the more expensive materials used when the valve disc is manufactured via machining (e.g., specialty barstock). When a valve disc is manufactured via casting, the disc is subjected to additional pressure testing that is not required for the valve discs disclosed herein. Additionally, the geometry requires less machining (e.g., due to fewer corners, apertures, etc.), creating less wasted material, and allows for a better surface finish (e.g., less surface roughness, fewer surface irregularities, etc.) to be obtained (e.g., by lapping).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A forged valve disc for a fluid valve, the forged valve disc comprising:
   a base portion having a first side and a second side opposite the first side, the first side having a seat interface to engage a seat of the fluid valve, the second side having a planar recessed surface and a centrally located stem cavity circumscribed by and extending below the planar recessed surface, the centrally located stem cavity to receive a valve stem of the fluid valve;
   a circumferential wall extending away from a peripheral edge of the second side, the circumferential wall having an inner surface and an outer surface opposite the inner surface, the inner surface and the outer surface defining a thickness of the circumferential wall, the circumferential wall having a height that is at least twice the thickness of the circumferential wall; and
   at least one structural support extending from the planar recessed surface adjacent the centrally located stem cavity to the inner surface adjacent a free end of the circumferential wall.

2. The forged valve disc of claim 1, wherein the height of the circumferential wall is at least five times the thickness of the circumferential wall.

3. The forged valve disc of claim 1, further including one or more annular cavities disposed on the outer surface of the circumferential wall, wherein the thickness of the circumferential wall is substantially uniform surrounding the one or more annular cavities.

4. The forged valve disc of claim 1, wherein the base portion has a height defined between the first side and the second side, and wherein the height of the base portion is less than the height of the circumferential wall.

5. The forged valve disc of claim 4, wherein a ratio of the height of the circumferential wall to the height of the base portion is at least 1.5.

6. The forged valve disc of claim 1, wherein the forged valve disc is configured to move away from the seat to vent a process fluid in response to a fluid pressure in the fluid valve exceeding a maximum fluid pressure, and wherein the maximum fluid pressure is based on a spring of the fluid valve operatively coupled to the valve stem.

7. The forged valve disc of claim 1, wherein the seat interface circumscribes a centrally located planar base surface of the first side, and wherein
   the seat interface includes a first annular protrusion extending away from the centrally located planar base surface and a second annular protrusion circumscribing the first annular protrusion and extending away from the centrally located planar base surface.

8. The forged valve disc of claim 1, further including a cylindrical cavity defined by the planar recessed surface of the second side of the base portion and the inner surface of the circumferential wall.

9. The forged valve disc of claim 1, wherein the at least one structural support includes four structural supports arranged at spaced intervals about the centrally located stem cavity, wherein each of the four structural supports extends from the planar recessed surface adjacent the centrally located stem cavity to the inner surface adjacent the free end of the circumferential wall at an angle between 30° and 60°.

10. The forged valve disc of claim 1, wherein the centrally located stem cavity has a conical shape.

11. The forged valve disc of claim 1, wherein the outer surface of the circumferential wall is to slidably engage a guide wall of the fluid valve to guide movement of the forged valve disc.

12. A forged valve disc for a fluid valve, the forged valve disc comprising:
    a base portion having a first side and a second side opposite the first side, the first side having a seat interface to engage a seat of the fluid valve, the second side having a planar recessed surface, a cylindrical step located centrally on and raised above the planar recessed surface, and a conical stem cavity disposed centrally within the cylindrical step, the conical stem cavity to receive a valve stem of the fluid valve;
    a circumferential wall extending away from a peripheral edge of the second side, the circumferential wall having an inner surface and an outer surface opposite the inner surface, the inner surface and the outer surface defining a thickness of the circumferential wall, the circumferential wall having a height that is at least twice the thickness of the circumferential wall; and
    at least one structural support extending from the planar recessed surface adjacent the cylindrical step to the inner surface adjacent a free end of the circumferential wall.

13. The forged valve disc of claim 12, wherein the height of the circumferential wall is at least five times the thickness of the circumferential wall.

14. The forged valve disc of claim 12, further including one or more annular cavities disposed on the outer surface of the circumferential wall, wherein the thickness of the circumferential wall is substantially uniform surrounding the one or more annular cavities.

15. The forged valve disc of claim 12, wherein the base portion has a height defined between the first side and the second side, and wherein the height of the base portion is less than the height of the circumferential wall.

16. The forged valve disc of claim 15, wherein a ratio of the height of the circumferential wall to the height of the base portion is at least 1.5.

17. The forged valve disc of claim 12, wherein the seat interface circumscribes a centrally located planar base surface of the first side, and wherein the seat interface includes a first annular protrusion extending away from the centrally located planar base surface and a second annular protrusion circumscribing the first annular protrusion and extending away from the centrally located planar base surface.

18. The forged valve disc of claim 12, wherein the at least one structural support includes four structural supports arranged at spaced intervals about the cylindrical step, wherein each of the four structural supports extends from the planar recessed surface adjacent the cylindrical step to the inner surface adjacent the free end of the circumferential wall at an angle between 30° and 60°.

* * * * *